Patented May 4, 1954

2,677,669

UNITED STATES PATENT OFFICE 2,677,669

STEPWISE STABILIZATION OF REDUCED METAL CATALYSTS

Jacob Elston Ahlberg, Chicago, Ill., assignor to the United States of America as represented by the United States Atomic Energy Commission No Drawing. Application January 11, 1945, Serial No. 572,434

4 Claims. (Cl. 252—472)

This invention relates to the manufacture of catalysts and more particularly an improved method for stabilizing a finely divided, reduced metal catalyst with respect to atmospheric air. The catalysts produced by the method of the present invention have been found particularly useful in accelerating the exchange of deuterium between hydrogen and water although they may be used for catalyzing other isotope exchange reactions or chemical reactions as well.

Conventional processes for producing reduced metal catalysts are well known in the art. In one such process, a basic carbonate of a metal is prepared by precipitation of the carbonate from a solution of the metal salt and the precipitated carbonate is then subjected to the action of a reducing atmosphere at elevated temperatures to decompose the metal carbonate to produce a metal in such form that it is an active catalyst. The reduction may be effected by charging the metal carbonate in the form of small aggregates or pellets into a reduction unit to form a thick layer or bed and then passing a reducing gas such as hydrogen through the bed at the desired elevated temperature to decompose the carbonate, reduce the resulting oxide and thereby produce a finely divided metal. The metal catalyst has frequently been formed on a suitable base such as "kieselguhr" or an oxide of a different metal.

Finely divided, reduced metal catalysts prepared in accordance with the foregoing procedure are subject to the disadvantage that they are pyrophoric, i. e. when exposed to atmospheric air they tend to oxidize very rapidly. Such a rapid oxidation produces considerable heat and may heat the catalyst to excessively high temperature. It is undesirable both because it makes the catalyst hazardous to handle and because it reduces or destroys the catalytic properties of the catalyst. Hence it is the usual practice to stabilize the catalyst with respect to atmospheric air following the reduction step. In accordance with one previously proposed process, stabilization is effected by flushing the reduction unit with nitrogen at the end of the reduction step and cooling the catalyst bed to approximately room temperature. A small quantity of oxygen is then introduced into the nitrogen atmosphere in contact with the catalyst bed and the oxygen concentration is gradually increased at a controlled rate until the catalyst is stabilized toward atmospheric air.

The purpose of such a process is to selectively oxidize the more active portions of the catalyst under conditions that are so controlled as to prevent excessive heating of the catalyst and consequent damage to the catalyst. However, it has been found that even when the admission of oxygen is carefully controlled there is still a tendency toward localized overheating or "hot spotting" in the catalyst bed. When such "hot spots" occur it is necessary that the addition of oxygen be interrupted until the "hot spot" has been cooled to the desired low temperature and thus frequent "hot spotting" not only damages portions of the catalyst but also substantially increases the time required for the stabilization process.

It is an object of the present invention to provide an improved method for stabilizing with respect to atmospheric air a finely divided, reduced metal catalyst.

It is another object of the invention to provide a method of stabilizing a reduced metal catalyst to produce a product which is more nearly uniform and has a higher average catalytic activity.

It is a further object of the invention to provide a method of stabilizing a reduced metal catalyst with respect to atmospheric air in a shorter period of time than has heretofore been possible.

It is still another object of the invention to provide a method of stabilizing a catalyst which reduces the frequency of occurrence and intensity of "hot spots" in the catalyst bed during stabilization.

It is a still further object of the invention to provide a method of stabilizing a catalyst under such conditions that heat produced by "hot spotting" can be more safely dissipated and the temperature of the catalyst more accurately and more effectively controlled.

Other objects of the invention will be in part obvious and in part pointed out hereinafter.

In one of its broader aspects the invention comprises exposing the catalyst bed after the reduction step to an atmosphere comprising an inert gas and a controlled amount of oxygen at a plurality of different and successively higher temperatures to stabilize first the more active portions of the catalyst and then, at successively higher temperatures, successively less active portions of the catalyst. It has been found that stabilization of a catalyst such as that referred to above may be carried out with advantage in a stepwise process wherein the catalyst is initially exposed at a relatively low temperature to an inert atmosphere having a relatively low controlled oxygen concentration. In this way, the more active portions of the catalyst may be stabilized at a sufficiently low temperature to prevent the catalyst bed from heating up due to "hot spotting" to such a temperature as to damage the catalyst and thereby reduce its activity. After the initial low temperature stabilization step, the catalyst may be warmed or permitted to heat up to a somewhat higher temperature and again stabilized by exposure to an atmosphere comprising an inert gas and an oxygen concentration which may or may not be greater than the oxygen concentration in the initial or low temperature step. The stepwise stabilization process of the present invention may be carried out in only two temperature steps or in a greater number of temperature steps, as desired.

Considering a somewhat narrower aspect of the present invention, the catalyst to be stabilized may be prepared as follows: A mixed basic carbonate of nickel and chromium is precipitated from a solution containing a mixture of nickel and chromium nitrates. The basic carbonate is then filtered and roasted to decompose the carbonate and produce a mixture of nickel and chromium oxides, following which the mixed oxides are subjected to a reducing atmosphere at an elevated temperature under such conditions that the nickel oxide is reduced to metallic nickel but the chromium oxide is not reduced. Upon completion of the reduction step the reduction unit containing the resulting nickel-chromia catalyst is flushed with an inert gas such as, for example, nitrogen to remove the reducing gas from the reduction unit and the catalyst is cooled to a temperature somewhat below room temperature. The replacement of the reducing gas by the nitrogen can be conveniently carried out by continuously circulating the reducing gas through the catalyst bed, adding nitrogen to the circulating gas and continuously venting the circulating gas until the reducing gas has been substantially completely replaced by nitrogen.

The catalyst may be stabilized in a nitrogen atmosphere or in an atmosphere of another inert gas such as carbon dioxide as disclosed in my copending application Serial No. 572,433 filed January 11, 1945. If a nitrogen atmosphere is used a small quantity of oxygen, say 0.1% by volume, is introduced into the circulating nitrogen at a temperature somewhat below room temperature and thereafter oxygen is added at a relatively slow controlled rate until there is no further tendency for the temperature of the bed to rise. This initial stabilization step serves to oxidize under controlled conditions the more active portions of the catalyst. When the catalyst bed has been stabilized at this relatively low temperature, it is either permitted to heat up or is warmed up to a temperature somewhat above room temperature and exposed to a circulating gas comprising nitrogen and controlled amount of oxygen that may or may not be the same as the oxygen concentration in the low temperature stabilization step. Circulation of the gas at a relatively higher temperature is continued until there is no further tendency for the catalyst bed to heat up. Thereupon, atmospheric air is gradually introduced into the circulating gas until the circulating gas becomes substantially all air. The second stabilization step serves to stabilize less active portions of the catalyst by a controlled process and the resulting catalyst is stable to atmospheric air at a temperature somewhat above room temperature so that it may be packaged or stored, as desired, in contact with air without danger of spontaneous overheating and combustion.

In order to point out more fully the nature of the present invention the following specific example is given to illustrate a preferred embodiment of the method of the invention. A solution containing 1.5 pounds of nickel nitrate $(Ni(NO_3)_2.6H_2O)$ and 0.0278 pound of chromium nitrate $(Cr(NO_3)_3.9H_2O)$ per gallon of solution was added to a strongly agitated solution containing 0.75 pound of sodium carbonate $(Na_2CO_3)$ per gallon to cause a precipitate of basic nickel and chromium carbonates to be formed. The nitrate solution was added to the carbonate solution until the pH of the resulting slurry was 7.0 to 7.4. The precipitate was filtered, washed free from soluble matter and partially dried by heating at 60° C. to 70° C. The dried product consisting of a mixture of the basic carbonates of nickel and chromium was broken up into lump form and charged into a rotary kiln wherein it was heated to a temperature of about 650° F. to decompose the carbonates and form a mixture of nickel and chromium oxides.

After completion of the roasting step as described above, the volatile content of the resulting oxide mixture was about 4 to 10%. The oxides were then ground, mixed with a small amount of graphite and formed into pellets or pills in the form of cylinders approximately $\frac{1}{8}$" in diameter by $\frac{1}{8}$" long. The pellets were charged into a reduction furnace provided with a circulating system for circulating gas through the catalyst bed in the furnace. The furnace was initially purged with nitrogen gas to eliminate air and the hydrogen was fed into the circulating system to replace the nitrogen. The nitrogen was continuously vented from the system until the hydrogen had been built up to the desired concentration, and the reduction was then carried out at a temperature of about 625° F. The extent to which the reduction had proceeded was determined by condensing out of the circulating gas the water formed in the reduction reaction and measuring the condensate to determine when the reaction was complete.

Upon completion of the reduction step nitrogen was introduced into the circulating system and hydrogen vented continuously to cause the nitrogen to replace the hydrogen in the circulating system. At the same time the bed was cooled to a temperature of about 50° F. Carbon dioxide was then introduced into the circulating gas to replace the nitrogen and the nitrogen vented. When the nitrogen had been replaced by carbon dioxide, elementary oxygen was admitted to the circulating system in an amount sufficient to produce an oxygen concentration of about 0.1% by volume and circulation of the oxygen-containing gas through the catalyst bed was continued. The bed was provided with a large number of thermocouples to permit observation of temperatures throughout the bed so that "hot spots" could be rapidly and effectively detected. Circulation of the carbon dioxide containing 0.1% oxygen was continued until temperature conditions within the bed were stabilized at 50° F. The oxygen concentration of the circulating gas was then increased in steps by further additions of elementary oxygen and the gas circulated after each oxygen addition until stable temperature conditions were again obtained within the bed. When the bed had become stabilized to oxygen concentrations of about 3% at 50° F., the catalyst was warmed up to 95° F. and atmospheric air was continuously introduced into the circulating gas and the gas continuously vented to cause the air to replace the carbon dioxide atmosphere. The air was added at a relatively slow rate, i. e. at such a rate as to require about 6 hours for complete replacement of the nitrogen by the air. At the end of this period it was found that the catalyst was completely stable to atmospheric air and could be packaged or stored as desired without danger of spontaneous overheating.

It will be recognized by those skilled in the art that it is not possible to give a precise stabilization schedule. The table given below sets forth the recommended minimum times at each of several oxygen concentrations during the initial or low temperature stabilization step as described above.

| Percent oxygen | Minimum time in hours |
| --- | --- |
| 0.1 | 1 |
| 0.25 | 3 |
| 0.5 | 1 |
| 0.75 | 1 |
| 1.0 | 1 |
| 1.5 | ½ |
| 2.0 | ½ |
| 3.0 | ¼ |

It is to be understood that the minimum times set forth in the above table are not absolute minima, that is, in particular cases it may be desirable to use somewhat shorter periods of time. Furthermore, the period for circulation at any given concentration may be substantially greater than that given in the table in cases where persistent "hot spotting" occurs. However, the minimum times given should usually be observed because of the fact that a certain amount of time may be required to initiate the oxidation reaction at any given concentration of oxygen.

It is to be understood that the foregoing specific example is illustrative only and that various modifications of procedure and changes of materials may be made. Thus other inert gases, such as helium may be substituted for the carbon dioxide and nitrogen specifically disclosed. Oxygen may be added to the circulating gas either in the form of pure oxygen or in the form of air in either or both of the stabilization steps. However if carbon dioxide is used, it is preferable that oxygen rather than air be admitted to the circulating system at least during the first stabilization step. Stabilization may be effected in more than two steps if desired.

In general it is desirable that the initial stabilization be carried out at a temperature below about 55° F. The lower limit of the temperature range for the initial stabilization step is largely determined by economical considerations. This step may, for example, be carried out at very low temperatures, i. e. temperatures substantially below 0° F., but ordinarily the cost of refrigerating the catalyst to such temperatures outweighs the advantages to be gained from their use.

It is not possible to state categorically the maximum temperature to which the catalyst may be safely heated without unduly impairing its activity. Different batches of catalyst prepared in accordance with the above illustrative procedure vary somewhat in their activity and also in their resistance to the effect of elevated temperatures. Furthermore it will be apparent to those skilled in the art that the above procedure for producing the catalyst may be varied and modified and such variations and modifications will produce variations in the activity of the catalyst and its resistivity to temperature effects. However it has been found, in general, that the temperature of the catalyst bed should desirably be maintained below about 120° F. in most cases and that the rate of addition of oxygen or air should be so controlled as to maintain the temperature of all parts of the bed below this value. In cases where two-step stabilization is used the preferred temperature range for the second or high temperature stabilization is about 90° to 120° F.

Although the method of the invention has been illustratively described as applied to a nickel catalyst supported on chromia, it is evident that the method may equally well be applied to the stabilization of other finely divided, metal catalysts on other substrata. Thus the method may be usefully applied in the stabilization of cobalt, copper or other similar metal catalysts and in the case of catalysts supported on kieselguhr, alumina or the like.

From the above description it is apparent that the present invention provides an improved method for stabilizing a reduced metal catalyst to produce a product having a relatively high catalytic activity by using a stepwise method of stabilization. The most active portions of the catalyst may be stabilized at a relatively low temperature so that there is little if any danger of "hot spots" causing a rise in temperature to an extent sufficient to damage the catalyst. On the other hand, the second stabilization step at a relatively high temperature ensures that the catalyst is stable to atmospheric air at all temperatures that are likely to be encountered during storage of the catalyst. Thus the catalyst is rendered completely stable under conditions which preserve its activity.

Since many embodiments might be made of the above-described invention and since many changes might be made in the embodiment described, it is to be understood that the foregoing description is to be interpreted as illustrative only and not in a limiting sense.

I claim:

1. The method of stabilizing with respect to atmospheric air a finely divided pyrophoric metal catalyst formed by reduction of a compound of said metal which comprises continuously circulating through a bed of said catalyst, a mixture of an inert gas and a small controlled amount of oxygen cooling said circulating gas mixture to maintain the temperature of said mixture and said bed below room temperature whereby only the more active portions of said catalyst are stabilized, then raising the temperature of said circulating gas mixture to a higher value above room temperature at which the less active portions of said catalyst are stabilized without substantial localized overheating and continuing the circulation of said gas mixture until the less active portions of said catalyst are stabilized.

2. The method of stabilizing with respect to atmospheric air a finely divided pyrophoric metal catalyst formed by reduction of a compound of said metal which comprises continuously circulating through a bed of said catalyst, a mixture of an inert gas and a small controlled amount of oxygen cooling said circulating gas mixture to maintain the temperature of said mixture and said bed below room temperature whereby only the more active portions of said catalyst are stabilized, then raising the temperature of said circulating gas mixture to a higher value above room temperature at which the less active portions of said catalyst are stabilized without substantial localized overheating increasing the concentration of oxygen in said gas mixture and continuing the circulation of said gas mixture until the less active portions of said catalyst are stabilized.

3. The method of stabilizing with respect to atmospheric air a finely divided pyrophoric metal catalyst formed by reduction of a compound of said metal which comprises continuously circulating through a bed of said catalyst a mixture of nitrogen and a small controlled amount of oxygen, cooling said circulating gas mixture to maintain the temperature of said mixture and said bed below about 55° F. whereby only the more active portions of said catalyst are stabilized, then raising the temperature of said circulating gas mixture to between 90° F. and 120° F. and continuing the circulation of said gas mixture at said higher temperature until the less active portions of said catalyst are stabilized.

4. The method of stabilizing with respect to atmospheric air a finely divided nickel catalyst formed by reduction of a nickel compound which comprises continuously circulating through a bed of said catalyst a mixture of nitrogen and a small controlled amount of oxygen, cooling said circulating gas mixture to maintain the temperature of said mixture and said bed below about 55° F. whereby only the more active portions of said catalyst are stabilized, then raising the temperature of said circulating gas to between 90° F. and 120° F., adding air to said circulating gas mixture at a controlled rate and continuing the circulation of said gas mixture at said higher temperature until the less active portions of said catalyst are stabilized.

References Cited in the file of this patent

UNITED STATES PATENTS

| Number | Name | Date |
|---|---|---|
| 1,093,377 | Boberg | Apr. 14, 1914 |
| 1,299,004 | Morrison | Apr. 1, 1919 |
| 2,112,643 | Baensch et al. | Mar. 29, 1938 |
| 2,274,988 | Matuszak | Mar. 3, 1942 |

FOREIGN PATENTS

| Number | Country | Date |
|---|---|---|
| 171,976 | Great Britain | Oct. 4, 1921 |

OTHER REFERENCES

Getman et al., Outlines of Theoretical Chemistry, 5th edition, page 336. Published by John Wiley and Sons, New York (1931). (Copy in Scientific Library.)